US009225705B2

(12) United States Patent
Lee et al.

(10) Patent No.: US 9,225,705 B2
(45) Date of Patent: *Dec. 29, 2015

(54) METHOD AND SYSTEM FOR PROVIDING A SERVICE FOR A MOBILE DEVICE AND NON-TRANSITORY COMPUTER-READABLE RECORDING MEDIUM

(71) Applicant: HTC Corporation, Taoyuan County (TW)

(72) Inventors: Po-Yen Lee, Taoyuan County (TW); Chien-Wen Chen, Taoyuan County (TW); Pai-Chang Yeh, Taoyuan County (TW); Li-Wen Lian, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,935

(22) Filed: Dec. 30, 2013

(65) Prior Publication Data

US 2014/0115667 A1 Apr. 24, 2014

Related U.S. Application Data

(63) Continuation of application No. 13/039,260, filed on Mar. 2, 2011, now Pat. No. 8,621,571.

(60) Provisional application No. 61/310,247, filed on Mar. 3, 2010.

(51) Int. Cl.
*H04L 29/06* (2006.01)
*H04L 29/08* (2006.01)
*H04W 12/06* (2009.01)

(52) U.S. Cl.
CPC .............. *H04L 63/08* (2013.01); *H04L 67/303* (2013.01); *H04W 12/06* (2013.01)

(58) Field of Classification Search
CPC .............................. H04L 63/08; H04L 67/303
USPC .............................................................. 726/3
See application file for complete search history.

(56) References Cited

U.S. PATENT DOCUMENTS 6,604,242 B1 * 8/2003 Weinstein et al. ............ 725/109
7,986,967 B2 * 7/2011 Koike ........................ 455/556.1
(Continued)

FOREIGN PATENT DOCUMENTS

| CN | 1867147 | 11/2006 |
|---|---|---|
| CN | 100477685 | 4/2009 |
| CN | 101853293 A * | 10/2010 |

OTHER PUBLICATIONS

"Office Action of Taiwan Counterpart Application", issued on Mar. 13, 2014, p1-p5, in which the listed references were cited.
(Continued)

*Primary Examiner* — Mahfuzur Rahman
(74) *Attorney, Agent, or Firm* — Jianq Chyun IP Office

(57) ABSTRACT

An online service providing system, a method, a server, and a mobile device thereof, and a computer program product are provided. The method includes sending a verification link corresponding to a user account that is not verified; after receiving a verification request corresponding to the verification link, determining whether a device identification sent by the mobile device that has logged in the user account is received; when receiving the device identification, confirming whether the user account is verified according to the device identification; after confirming that the user account is verified, when receiving a service request sent by a terminal device logging the user account into a service website, determining a homepage of the service website according to the device identification, and providing the online service corresponding to the mobile device to the terminal device through the service website.

15 Claims, 5 Drawing Sheets

(56) References Cited

U.S. PATENT DOCUMENTS

| | | | |
|---|---|---|---|
| 8,116,768 B2* | 2/2012 | Kishida et al. | 455/435.1 |
| 8,495,729 B2* | 7/2013 | Park | 726/21 |
| 8,725,884 B2* | 5/2014 | Kubota et al. | 709/228 |
| 8,838,071 B1* | 9/2014 | Cronin | 455/411 |
| 2006/0224707 A1* | 10/2006 | Kawai et al. | 709/220 |
| 2006/0294580 A1 | 12/2006 | Yeh | |
| 2007/0208686 A1* | 9/2007 | Gupta et al. | 707/1 |
| 2007/0225037 A1* | 9/2007 | Koike | 455/556.1 |
| 2008/0077394 A1* | 3/2008 | Fukuoka et al. | 704/8 |
| 2008/0195409 A1 | 8/2008 | Shankland | |
| 2008/0214215 A1* | 9/2008 | Aaltonen et al. | 455/466 |
| 2008/0216153 A1* | 9/2008 | Aaltonen et al. | 726/3 |
| 2009/0066710 A1* | 3/2009 | Pathak | 345/581 |
| 2009/0258681 A1* | 10/2009 | Kishida et al. | 455/566 |
| 2011/0219429 A1* | 9/2011 | Lee et al. | 726/3 |
| 2013/0318587 A1* | 11/2013 | Shamsspoor | 726/7 |

OTHER PUBLICATIONS

"Office Action of Taiwan Counterpart Application", issued on Sep. 15, 2015, p.1-p.6, in which the listed references were cited.

* cited by examiner

METHOD AND SYSTEM FOR PROVIDING A SERVICE FOR A MOBILE DEVICE AND NON-TRANSITORY COMPUTER-READABLE RECORDING MEDIUM

CROSS-REFERENCE TO RELATED APPLICATION

This application is a continuation application of and claims the priority benefit of a prior application Ser. No. 13/039,260, filed on Mar. 2, 2011. The prior application Ser. No. 13/039,260 claims the priority benefit of U.S. Provisional application Ser. No. 61/310,247, filed on Mar. 3, 2010. The entirety of each of the above-mentioned patent applications is hereby incorporated by reference herein and made a part of this specification.

BACKGROUND

1. Field of the Invention

The invention relates to a method for providing an online service. Particularly, the invention relates to an online service providing system, method, server and a mobile device thereof and a computer program product.

2. Description of Related Art

With development of mobile technology, mobile communication devices have gradually become one of indispensable tools in people's daily life. Taking a personal digital assistant (PDA) phone as an example, the PDA phone not only has various functions of a conventional mobile phone, a user can also perform functions of editing document, transceiving emails, browsing websites and instant messaging, etc. through software built therein. As the above functions can be used at any time anywhere, popularization of the mobile communication devices is gradually increased in recent years. In order to improve a rate of market share and competitiveness, besides the above device functions, various online services of the mobile communication devices are also developed to draw attentions of the consumers.

Generally, the user has to first register a user account on a server erected by a mobile operator, and logs the users account through a terminal device to use services provided by the server or download application programs. However, since the server can only identify the terminal device according to the user account, it is hard for the server to determine a type of the device used by the user. In other words, the server cannot provide corresponding functions according to different types of the devices, which may cause inconvenience when the user uses the online services.

SUMMARY OF THE INVENTION

Accordingly, the invention is directed to an online service providing system, method, server and a mobile device thereof and a computer program product, which can provide a corresponding online service to a terminal device according to a type of the connected mobile device.

The invention provides a method for providing an online service for a mobile device, which is adapted to a server providing a service website. The method is described as follows. A verification link corresponding to a user account that is not verified is sent. After a verification request corresponding to the verification link is received, it is determined whether a device identification sent by the mobile device that has logged in the user account is received. When it is determined the device identification sent by the mobile device that has logged in the user account is received, it is confirmed whether the user account is verified according to the device identification. After it is confirmed that the user account is verified, and when a service request sent by a terminal device logging the user account into the service website is received, a homepage of the service website is determined according to the device identification, and the online service corresponding to the mobile device is provided to the terminal device through the service website.

According to another aspect, the invention provides an online service system including a server and a mobile device. The server includes a data transmission unit, a verification unit and a service providing unit. The verification unit is coupled to the data transmission unit for sending a verification link corresponding to a user account that is not verified through the data transmission unit. The service providing unit is coupled to the verification unit and the data transmission unit for providing a service website. The mobile device includes a wireless communication module, an input module and a processing module. The input module is used for receiving the user account. The processing module is coupled to the wireless communication module and the input module, and after the mobile device logs in the user account, the processing module sends a device identification of the mobile device to the server through the wireless communication module. The verification unit of the server determines whether the device identification sent by the mobile device is received after receiving a verification request corresponding to the verification link. After the verification unit determines that the device identification sent by the mobile device that has logged in the user account is received, it confirms whether the user account is verified according to the device identification. After the verification unit confirms that the user account is verified, when the service providing unit receives a service request sent by a terminal device logging the user account into the service website through the data transmission unit, the service providing unit determines a homepage of the service website according to the device identification, and provides an online service corresponding to the mobile device to the terminal device through the service website.

According to another aspect, the invention provides a server including a data transmission unit, a verification unit and a service providing unit. The verification unit is coupled to the data transmission unit, and sends a verification link corresponding to a user account that is not verified through the data transmission unit, and determines whether a device identification sent by a mobile device that has logged in the user account is received after receiving a verification request corresponding to the verification link. After the verification unit determines that the device identification sent by the mobile device that has logged in the user account is received, it confirms whether the user account is verified according to the device identification. The service providing unit is coupled to the verification unit and the data transmission unit for providing a service website. After the verification unit confirms that the user account is verified according to the device identification, when the service providing unit receives a service request sent by a terminal device logging the user account into the service website through the data transmission unit, the service providing unit determines a homepage of the service website according to the device identification, and provides an online service corresponding to the mobile device to the terminal device through the service website.

According to another aspect, the invention provides a mobile device including a wireless communication module, an input module and a processing module. The input module is used for receiving a user account, where the user account is registered on a service website provide by a server, and the server has received a verification request of a verification link corresponding to the user account. The processing module is coupled to the wireless communication module and the input module, and after the mobile device logs in the user account, the processing module sends a device identification of the mobile device to the server through the wireless communication module, so as to make the server confirm whether the user account is verified according to the device identification. In case that the user account is verified, when the server receives a service request sent by a terminal device logging the user account into the service website, the server determines a homepage of the service website according to the device identification, and provides an online service corresponding to the mobile device to the terminal device through the service website.

According to another aspect, the invention provides a computer program product, which includes at least one program instruction for loading into a server used for providing a service website. Following steps are executed after the at least one program instruction is loaded into the server. A verification link corresponding to a user account that is not verified is sent. After a verification request corresponding to the verification link is received, it is determined whether a device identification sent by a mobile device that has logged in the user account is received. When it is determined that the device identification sent by the mobile device that has logged in the user account is received, it is confirmed whether the user account is verified according to the device identification. After it is confirmed that the user account is verified, when a service request sent by a terminal device logging the user account into the service website is received, a homepage of the service website is determined according to the device identification, and an online service corresponding to the mobile device is provided to the terminal device through the service website.

According to the above descriptions, after the user registers the user account of the server, it has to wait for the user using the mobile device to complete verifying the user account. Then, the server displays a corresponding homepage on the service website according to the mobile device used for completing the verification. In this way, the user may intuitively and conveniently use the online service provided by the server after connecting the service website.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
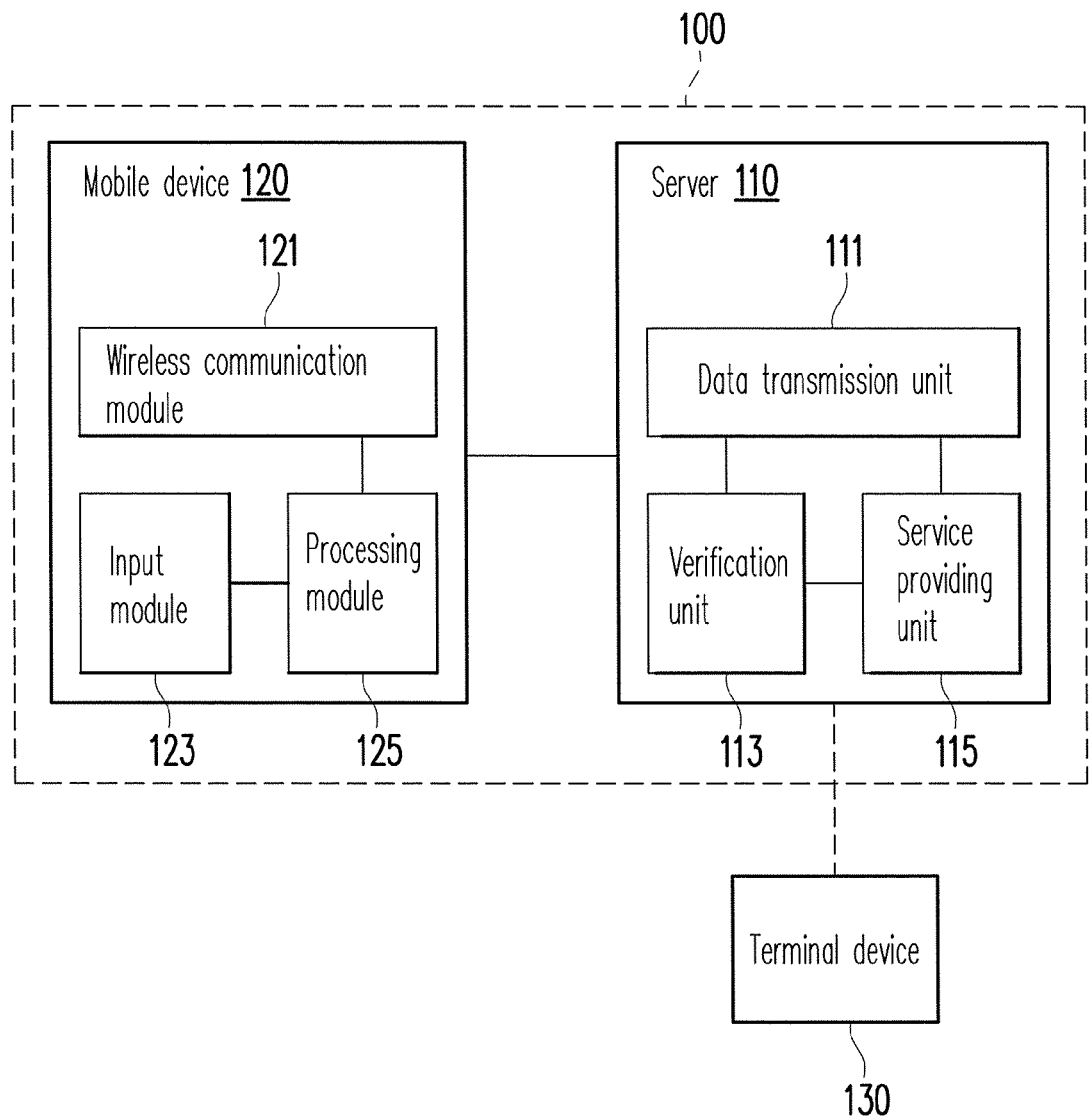
FIG. 1 is a block diagram of an online service system according to an embodiment of the invention.

FIG. 1 is a block diagram of an online service system according to an embodiment of the invention. Referring to FIG. 1, the online service system 100 includes a server 110 and a mobile device 120. The server 110 provides online services for a plurality of types of mobile devices through a service website, and after a user uses the mobile device 120 to complete verifying a user account, the user may use the verified user account to log in the service website through a terminal device 130, so as to use an online service corresponding to the mobile device 120 through the terminal device 130. In the present embodiment, the terminal device 130 may be a computer system of a desktop computer or a notebook computer, which is not limited by the invention.

As shown in FIG. 1, the server 110 includes a data transmission unit 111, a verification unit 113 and a service providing unit 115. The data transmission unit 111 may support a wired transmission interface or a wireless transmission interface. For example, the wired transmission interface is an interface capable of connecting the server 110 to a network through an asymmetric digital subscriber line (ADSL), and the wireless transmission interface is, for example, an interface capable of connecting the server 110 to one of a third generation telecommunication (3G) network, a wireless fidelity (Wi-Fi) network, a worldwide interoperability for microwave access (WiMAX) network and a general packet radio service (GPRS) network, or a combination thereof. Where, data transmission is performed between the terminal device 130 and the server through the data transmission unit 111 after the terminal device 130 connects the network.

The verification unit 113 is coupled to the data transmission unit 111, and the service providing unit 115 is coupled to the data transmission unit 111 and the verification unit 113. In the present embodiment, the verification unit 113 and the service providing unit 115 may be any functional blocks implemented by hardware and/or software. The hardware includes a central processing unit (CPU), a chipset, a microprocessor, a controller or a control circuit, etc., or a combination of the above devices. The software may be an operating system (OS), a driving program or an application program (AP), etc.

The mobile device 120 includes a wireless communication module 121, an input module 123 and a processing module 125. In the present embodiment, the mobile device 120 is, for example, a device having a wireless communication function, such as a mobile phone, a smart phone, a personal digital assistant (PDA), or a PDA phone, etc., which is not limited by the invention.

The wireless communication module 121 may be one of a 3G mobile communication module, a Wi-Fi module, a WiMAX module and a GPRS module or a combination thereof. The mobile device 120 and the server 110 is communicated through the wireless communication module 121 and the data transmission unit 111.

The input module 120 is, for example, any device capable of receiving an input from the user, such as a button, a keyboard, or a touch screen, etc. The processing module 125 is coupled to the wireless communication module 121 and the input module 123 for controlling an operation of the mobile device 120. For example, the processing module 125 may be a CPU, a chipset, a microprocessor, a controller and/or other control circuits. The processing module 125 may also be an OS, a driving program or an application program, etc.

In the present embodiment, the user may register the user account by using any device (which is not limited to the mobile device 120 or the terminal device 130) capable of connecting the server 110 through the network, and during a registration procedure of the user account, the server 110 may request the user to pre-select a device type of the mobile device and request the user to input related information such as a password, an email address and a telephone number, etc. However, it should be noticed that although the user is able to use the user account to log in the service website through the terminal device 130 or any device capable of connecting the server 110 through the network after the registration, before the server 110 confirms that the user account is verified, the user cannot use online services provided by the server 110. An embodiment is provided below to describe how the online service system 10 complete verifying the user account, and how to provide the online service after the verification.

Figure 2:
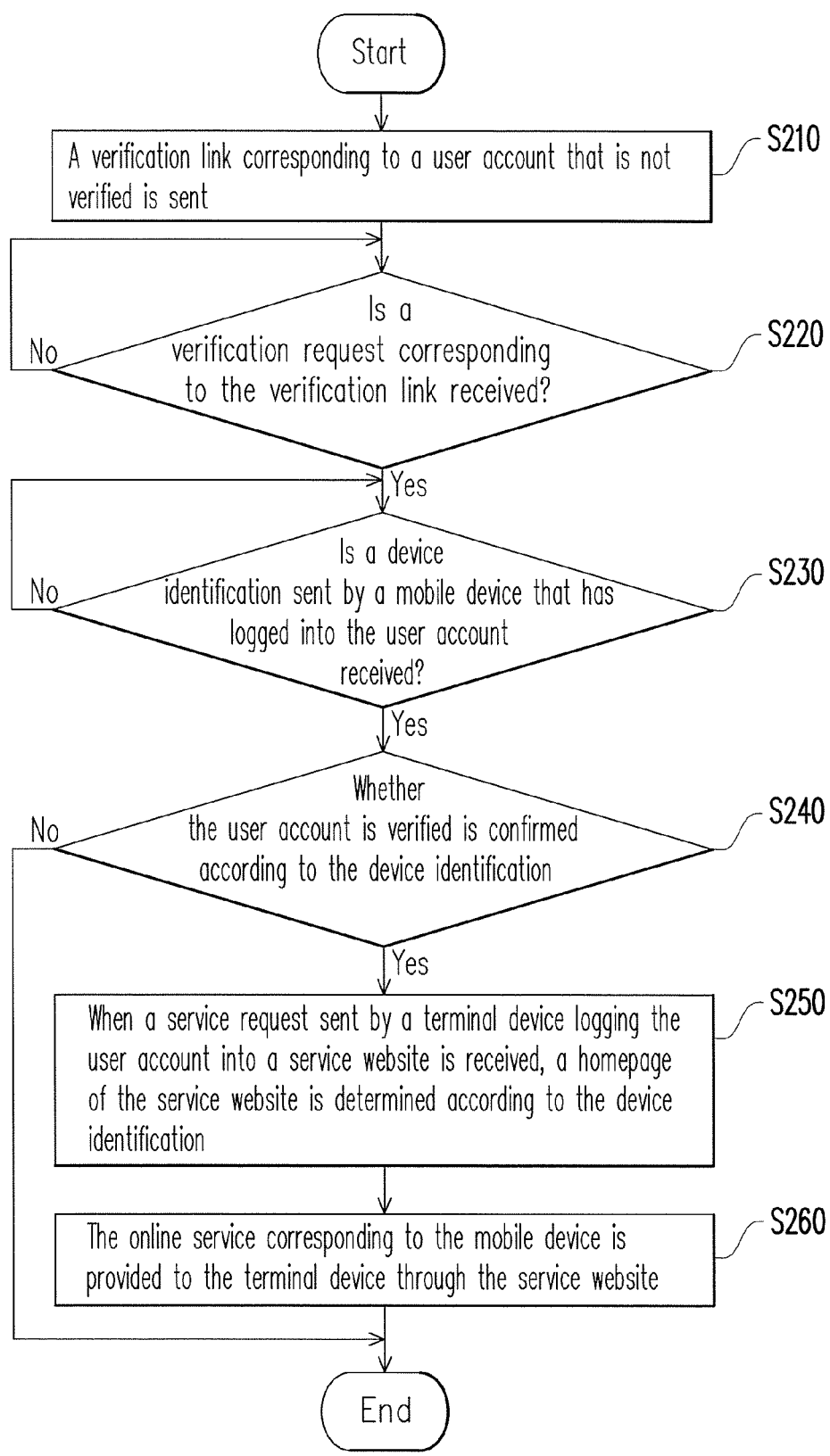
FIG. 2 is flowchart illustrating a method for providing an online service for a mobile device according to an embodiment of the invention.

FIG. 2 is flowchart illustrating a method for providing an online service for a mobile device according to an embodiment of the invention. Referring to FIG. 1 and FIG. 2, in the present embodiment, it is assumed that the user has registered a user account of the server 110.

First, in step S210, after the user completes the registration procedure, the verification unit 113 of the server 110 sends a verification link corresponding to the user account that is not verified to the user through the data transmission unit 111. For example, the verification unit 113 sends a verification mail containing the verification link to the email address filled by the user during the registration.

Then, in step S220, the verification unit 113 repeatedly determines whether a verification request corresponding to the verification link is received. When the user clicks the verification link in the verification mail sent by the server 110, the verification unit 113 may receive the verification request from the user. Then, in step S230, the verification unit 113 repeatedly determines whether a device identification sent by the mobile device that has logged in the user account is received.

In the present embodiment, it is assumed that the user uses the mobile device 120 to verify the user account. The user inputs the user account and related information (for example, the password, the email address and the telephone number, etc.) through the input module 123 of the mobile device 120 to log in the user account through the mobile device 120. Then, when the processing module 125 detects a specific operation performed by the user (for example, pressing a specific physical key or a software key), the processing module 125 sends the device identification of the mobile device 120 and the related information such as the password, the email address and the telephone number, etc. to the server 110 through the wireless communication module 121.

After the server 110 receives the device identification sent by the mobile device 120 that has logged in the user account, in step S240, the verification unit 113 confirms whether the user account is verified according to the device identification. In the present embodiment, the device identification is an international mobile equipment identify (IMEI) including information such as an actual device model of the mobile device 120 and a manufacturing serial number, etc. Since each mobile device corresponds to a unique IMEI, the verification unit 113 identifying the mobile device 120 according to the IMEI, so as to determine whether the online service provided by the server 110 is suitable for the mobile device 120.

If the verification unit 113 cannot identify the mobile device 120 according to the device identification (which is the IMEI in the present embodiment), it represents that the online service provided by the server 110 is not suitable for the mobile device 120. Then, the verification unit 113 determines that the user account is not verified, and the flow of the method for providing the online service for the mobile device is ended.

If the verification unit 113 identifies the mobile device 120 according to the device identification, it represents that the server 110 is able to provide the online service suitable for the mobile device 120. Therefore, the verification unit 113 confirms that the user account is verified. Then, in step S250, when the server 110 receives a service request sent by the terminal device 130 logging the verified user account into the service website through the data transmission unit 111, the service providing unit 115 determines a homepage of the service website according to the device identification.

Finally, in step S260, the service providing unit 115 provides the online service corresponding to the mobile device 120 to the terminal device 130 through the service website. In detail, after the user uses the verified user account to log in the service website through the terminal device 130, the user may browse the service website and perform operations through a browser in the terminal device 130. When the user clicks a button or an option displayed on the service website, the service providing unit 115 receives an online service request from the terminal device 130 through the service website, and since the user account is verified through the mobile device 120, the service providing unit 115 controls the mobile device 120 to perform a corresponding operation according to the online service request.

In another embodiment, if the mobile device 120 is kept in a state of logging the verified user account, once the user uses the user account to log in the service website through the terminal device 130 (i.e. the server 110 receives a service request sent by the terminal device 130), the service providing unit 115 automatically obtains contact information and an email address stored in the mobile device 120, and establishes a group list according to the contact information and the email address, and displays the group list on the service website for user's reference. For example, in allusion to all of the mobile devices that use the verified user accounts to log in the service website, the service providing unit 115 obtains the contact information and the email addresses of the mobile devices, and finds users recorded as mutual contacts through cross-matching to establish the above group list.

It should be noticed that if the user uses the user account to log in the service website through the terminal device 130 before the user account is verified, although the service providing unit 115 may receive the service request from the terminal device 130 through the data transmission unit 111, the service providing unit 115 does not provide the online service to the terminal device 130. In the present embodiment, the service providing unit 115 displays a verification prompt image on the service website to notify the user that after clicking the verification link sent by the server 110, the user has to first log in the user account through the mobile device supported by the online service system 100, and after the server 110 complete verifying the user account, the mobile device online service provided by the server 110 may be used by other devices (for example, the terminal device 130).

Figure 3:
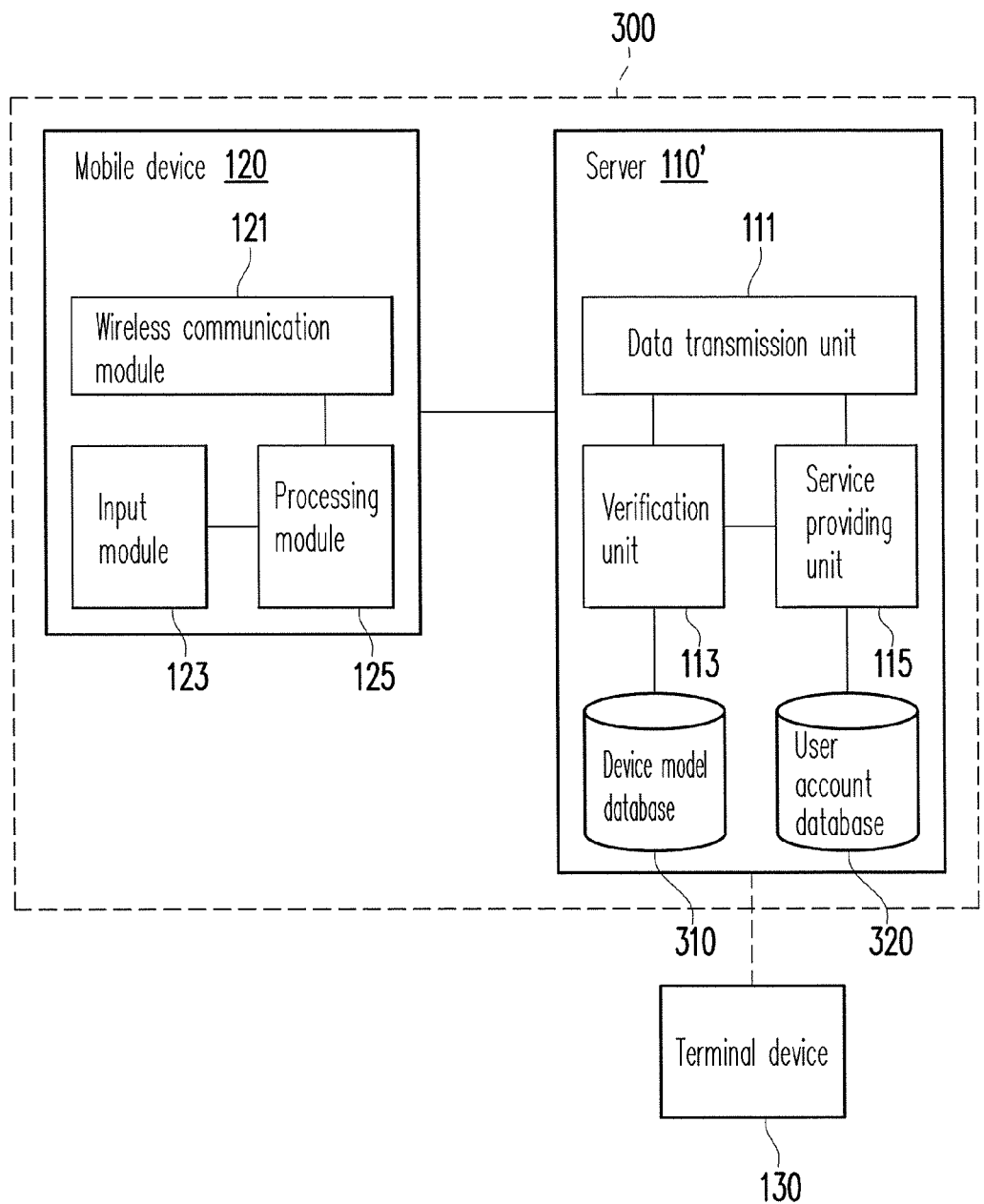
FIG. 3 is a block diagram of an online service system according to another embodiment of the invention.

FIG. 3 is a block diagram of an online service system according to another embodiment of the invention. Referring to FIG. 3, the online service system 300 is similar to the online service system 100 of FIG. 1, and only differences there between are described as follows.

In the present embodiment, the server 110' includes a data transmission unit 111, a verification unit 113, a service providing unit 115, a device model database 310 and a user account database 320. The device model database 310 is coupled to the verification unit 113, and the user account database 320 is coupled to the service providing unit 115.

The device model database 310 records one or a plurality of system preset device models. The user account database 320 records the user accounts and the related information. For example, when the user registers a new user account, the user first selects a user preset device model, and fills data such as a password, an email address and a phone number, etc., and a corresponding relation of the above information and the user account is recorded in the user account database 320.

Figure 4:
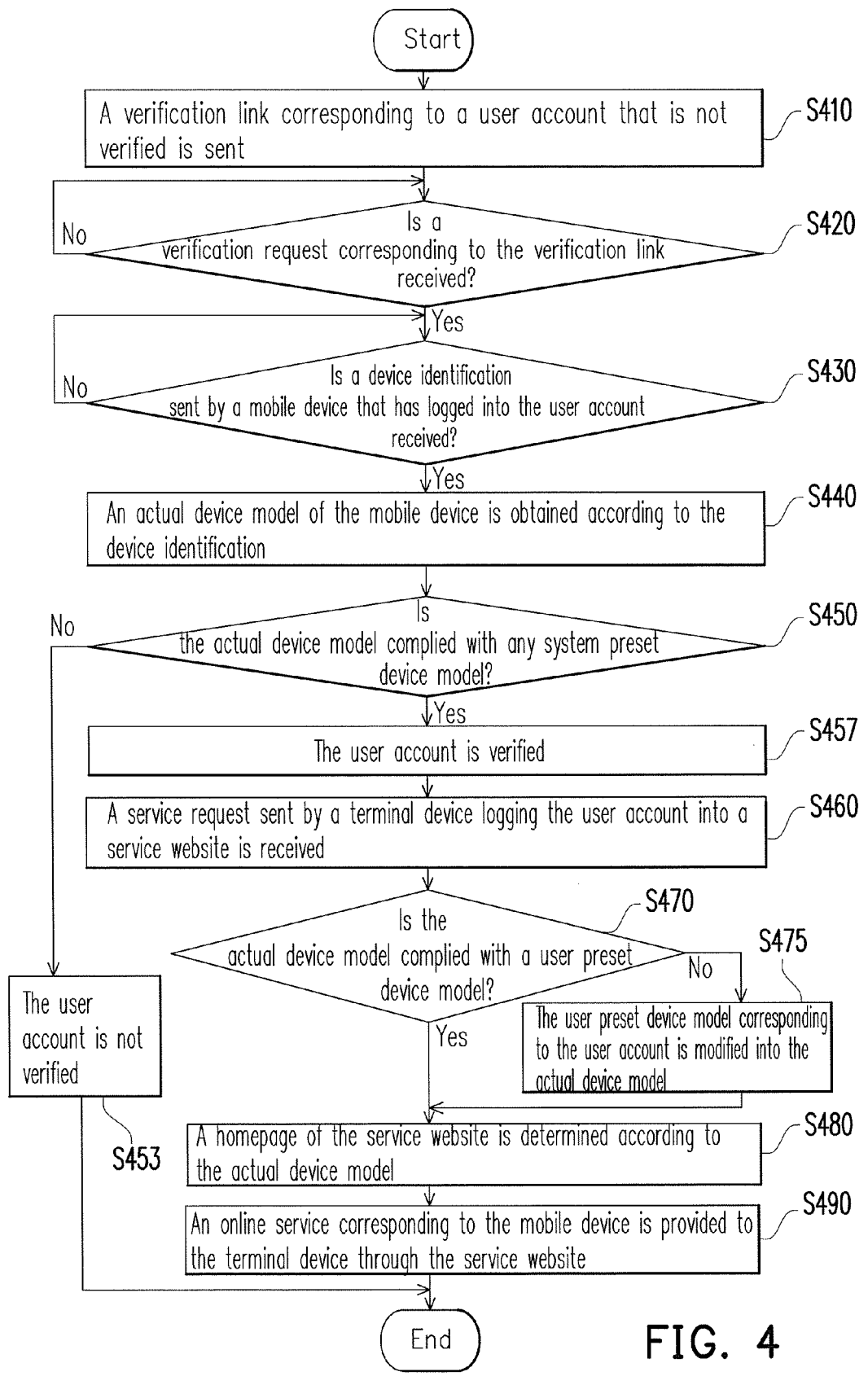
FIG. 4 is flowchart illustrating a method for providing an online service for a mobile device according to another embodiment of the invention.

A detailed operation method of the online service system 300 is described with reference of FIG. 4. Since steps S410-S420 of FIG. 4 are similar to the steps S210-S230 of FIG. 2, detailed descriptions thereof are not repeated.

In the present embodiment, it is assumed that the user has registered a user account of the server 110', though the user account is still not verified. If the user wants to verify the user account by using the mobile device 120, the user has to log in the user account though the mobile device 120, and performs a specific operation to drive the processing module 125 to send the device identification (for example, the IMEI) of the mobile device 120 to the server 110'. After the verification unit 113 of the server 110' receives the device identification of the mobile device 120 through the data transmission unit 111, in step S440, the verification unit 113 obtains an actual device model of the mobile device 120 according to the device identification.

In step S450, the verification unit 113 compares the actual device model with the system preset device models recorded in the device model database 310 to determine whether the actual device model is complied with any one of the system preset device models, and if not, it represents that the online service provided by the server 110' is not suitable for the mobile device 120, and in step S453, the verification unit 113 determines that the user account is not verified, and the flow of the method for providing the online service for the mobile device is ended.

If the actual device model is complied with one of the system preset device models, in step S457, the verification unit 113 confirms that the user account is verified. In other words, as long as the user logs in the user account to be verified through the mobile device complied with the system preset device model to connect the server 110', verification of the user account is completed. Then, the user is able to use the verified user account to log in the service website through any terminal device to use the online service provided by the server 110'.

When the user uses the user account verified through the mobile device 120 to log in the service website through the terminal device 130, in step S460, the server 110' may receive a service request sent by the terminal device 130.

In step S470, the service providing unit 115 obtains the actual device model of the mobile device 120 according to the device identification, and determines whether the actual device model is complied with the user preset device model selected during the registration.

If the two device models are complied, in step S480, the service providing unit 115 determines a homepage of the service website according to the actual device model, and if the two device models are not complied, in step S475, the service providing unit 115 modifies the user preset device model corresponding to the user account into the actual device model in the user account database 320. Then, in the step S480, the homepage of the service website is determined according to the actual device model. In this way, even if the user preset device model selected by the user during the registration is different to the actual device model of the mobile device logging in the user account afterwards, the service providing unit 115 can still ensure a content of the homepage corresponds to the currently used mobile device 120 according to the above mechanism.

Figure 5:
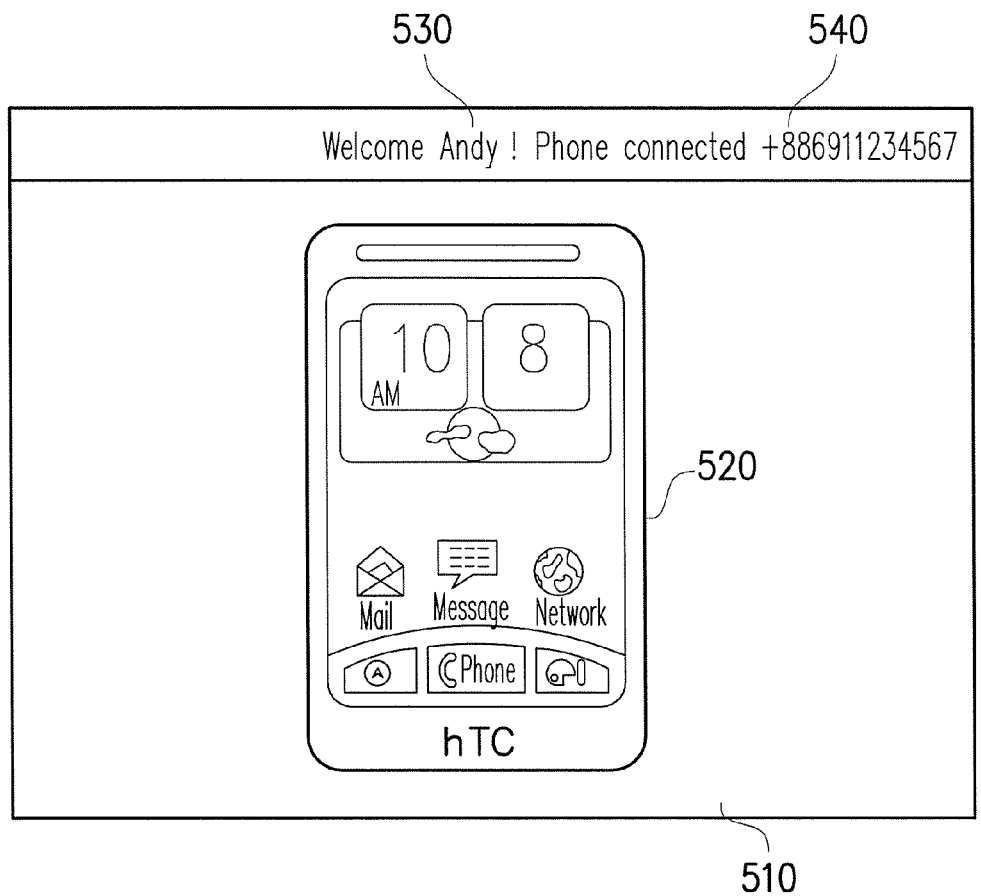
FIG. 5 is a schematic diagram of a homepage of a service website according to an embodiment of the invention.

In the present embodiment, when the service providing unit 115 determines the homepage according to the actual device model, the service providing unit 115 obtains a device appearance panel corresponding to the actual device model, and obtains a visual setting (for example, a wallpaper and a theme, etc.) stored in the mobile device 120 through the data transmission unit 111, and displays the visual setting on the homepage according to the device appearance panel. Moreover, the service providing unit 115 may also display the user account and the phone number of the mobile device 120 on the homepage. FIG. 5 is a schematic diagram of a homepage of a service website according to an embodiment of the invention. Referring to FIG. 5, the user may browse the homepage 510 of the service website through a browser of the terminal device 130. The homepage 510 displays a device appearance panel 520 corresponding to the mobile device 120, and the user is able to see related settings displayed on a home screen of the mobile device 120 through the device appearance panel 520. In the present embodiment, the homepage 510 also displays a user account 530 and a phone number 540 of the mobile device 120.

Finally, in step S490, the service providing unit 115 provides the online service corresponding to the mobile device 120 to the terminal device 130 through the service website. Since the content displayed on the homepage corresponds to the mobile device 120 currently logging the user account for connecting the server 110', when the user uses the online service of the service website through the terminal device 130, the user may have a feeling of directly operating the mobile device 120.

The invention provides a computer program product, which is basically composed of a plurality of program instructions, and after these program instructions are loaded into the server and executed by the same, various steps of the aforementioned method for providing the online service for the mobile service can be executed, and meanwhile the server can implement various functions described above. The computer program product may be stored in any data storage device (including a read-only memory, a random access memory, a magnetic tape, a floppy dick, a hard disk, a CD-ROM and a transmission media, etc.), or may be directed provided through network transmission, which is not limited by the invention.

In summary, according to the method for providing an online service, the mobile device and the non-transitory computer-readable recording medium, after the user registers the user account, the mobile device has to be used to log in the user account to complete verifying the user account. After the verification, the user may use the user account to log in the service website through any terminal device, and may browse an appearance of the mobile device currently logging the user account on the homepage of the service website. In this way, the server may effectively provides the online service required by the connected mobile device, and when the user uses the online service of the mobile device through the terminal device, the user may clearly and intuitively select the required operations without confusion.

It will be apparent to those skilled in the art that various modifications and variations may be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for providing an online service for a mobile device and a terminal device, adapted to a server providing a service website of the online service, wherein the server comprises a data transmission circuit and a service providing circuit, the method comprising:
   receiving, by the data transmission circuit, a device identification from the mobile device, wherein the device identification comprises an actual device model of the mobile device;
   determining and providing, by the service providing circuit, a homepage of the service website of the online service according to the device identification of the mobile device, wherein the provided homepage displays a device appearance panel corresponding to the actual device model of the mobile device, wherein the device appearance panel displays an outline appearance of the actual device model of the mobile device;
   obtaining, by the data transmission circuit, a visual setting stored in the mobile device from the mobile device; and
   displaying, by the service providing circuit, a home screen of the mobile device on the homepage according to the obtained visual setting through the device appearance panel displayed on the homepage.

2. The method of claim 1, further comprises:
   confirming whether a user account logged in the mobile device is verified according to the device identification.

3. The method of claim 2, wherein the online service further stores an information of corresponding relation between the user account and a user preset device model, wherein the user preset device model is obtained when the service executes a registration procedure of the user account.

4. The method of claim 1, wherein the step of determining the homepage according to the device identification comprises:
   determining whether the actual device model matches a user preset device model; and
   in response to determining that the actual device model matches the user preset device model, determining the homepage according to the actual device model.

5. The method of claim 4, further comprises:
   in response to determining that the actual device model does not match the user preset device model, modifying the user preset device model according to the actual device model, and determining the homepage according to the actual device model.

6. The method of claim 1, wherein the online service stores at least one system preset device model for determining whether the received actual device model match one of the system preset device model.

7. A non-transitory computer-readable recording medium, comprising computer executable program instructions for:
   connecting with a mobile device;
   receiving a device identification from the mobile device, wherein the device identification comprises an actual device model of the mobile device;
   determining and providing a homepage of a service website of an online service according to the device identification of the mobile device, wherein the provided homepage displays a device appearance panel corresponding to the actual device model of the mobile device, wherein the device appearance panel displays an outline appearance of the actual device model of the mobile device;
   obtaining a visual setting stored in the mobile device from the mobile device; and
   displaying a home screen of the mobile device on the homepage according to the obtained visual setting through the device appearance panel displayed on the homepage.

8. A system for providing an online service for a mobile device and a terminal device, wherein,
   the mobile device connects with the online service and sends a device identification of the mobile device to the online service, wherein the device identification comprises an actual device model of the mobile device, and
   after the online service receives the device identification, the service determines and provides a homepage of a service website of the online service according to the device identification of the mobile device, wherein the provided homepage displays a device appearance panel corresponding to the actual device model of the mobile device, wherein the device appearance panel displays an outline appearance of the actual device model of the mobile device, a visual setting is obtained from the mobile device, and a home screen of the mobile device on the homepage displayed on the homepage through the device appearance panel according to the obtained visual setting.

9. The system of claim 8, wherein the online service confirms whether a user account logged in the mobile device is verified according to the device identification.

10. The system of claim 9, wherein the online service further stores an information of corresponding relation between the user account and a user preset device model, wherein the user preset device model is obtained when the service executes a registration procedure of the user account.

11. The system of claim 8, wherein the online service determines whether the actual device model matches a user preset device model, and in response to determines that the actual device model matches the user preset device model, determines the homepage according to the actual device model.

12. The system of claim 11, wherein in response to determines that the actual device model does not match the user preset device model, the system modifies the user preset device model according to the actual device model, and determining the homepage according to the actual device model.

13. The system of claim 8, wherein the online service stores at least one system preset device model for determining whether the received actual device model match one of the system preset device model.

14. The system of claim 8, wherein the visual setting comprise a setting of a wallpaper of the mobile device.

15. The system of claim 8, wherein the online service obtains contact information stored in the mobile device, wherein the contact information comprises a phone number and an email address.

* * * * *